3,753,883
PROCESS FOR PROVIDING A HYDRIDE-FREE AND OXIDE-FREE SURFACE ON ZIRCONIUM AND ZIRCONIUM-ALLOY BODIES
Bruce Griggs, Richland, Wash., assignor to the United States of America as represented by the United States Atomic Energy Commission
Filed June 26, 1972, Ser. No. 266,110
Int. Cl. C23b 1/00, 1/02
U.S. Cl. 204—144.5                    7 Claims

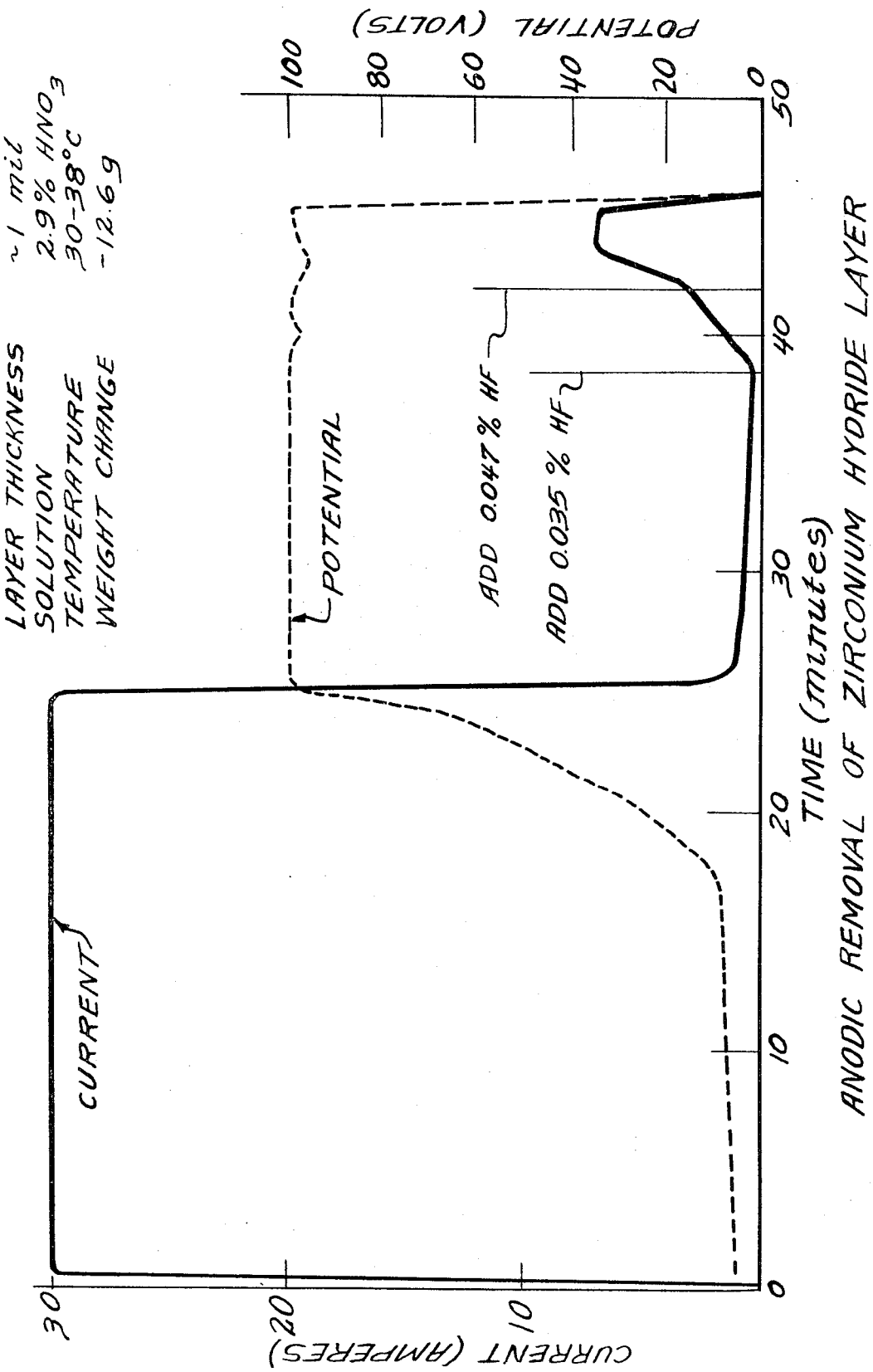

ABSTRACT OF THE DISCLOSURE

A zirconium or zirconium-alloy body having a zirconium hydride surface layer is electrolytically anodized in aqueous nitric acid solution to remove the hydride surface. Fluoride ions are then added to the solution and electrolytic anodization is continued. Chemical etching with $HNO_3$-HF solution thereupon provides a hydride-free and oxide-free surface. Chemical etching may be in situ employing the anodization bath as etchant if the concentration of fluoride ions therein is high or a separate etchant solution may be employed.

CONTRACTUAL ORIGIN OF THE INVENTION

The invention described herein was made in the course of, or under, a contract with the United States Atomic Energy Commission.

SPECIFICATION

The invention relates to a process for providing a hydride-free and oxide-free surface on zirconium and zirconium-alloy bodies.

Zirconium and its alloys tend to react with or absorb hydrogen under certain processing or use conditions. The hydrogen thus absorbed forms a hydrogen-rich phase in the metal. This zirconium hydride phase can distribute itself as a surface layer, a uniformly distributed precipitate, or both, depending on the conditions of its formation and subsequent treatment. The presence of zirconium hydride in zirconium or its alloys usually produces undesirable properties for structural applications. The removal of a zirconium hydride surface layer from a zirconium alloy is frequently desirable to avoid its future redistribution throughout the metal during subsequent processing or use conditions.

Surface layers of zirconium hydride can be removed by chemical etching in $HNO_3$-HF solutions, abrasive blast techniques, machining or grinding. None of these methods are selective and thus require a detailed knowledge of the amount and distribution of the zirconium hydride to be removed. Hot vacuum extraction can only be employed for hydrogen removal if the part be sufficiently heated in a high vacuum.

An object of this invention is to provide a process for the selective removal of dense zirconium hydride layers from zirconium and its alloys, and the obtaining of a hydride-free and oxide-free surface.

Another object is to provide an efficient and economical process for the removal of surface hydride layers present on nuclear reactor process tubes made of zirconium or zirconium alloys consisting essentially of zirconium, such as Zircaloy-2 (an alloy of zirconium with 1.5% by weight Sn, 0.15% Fe, 0.10% Cr and 0.0–0.05% Ni).

The single figure of the drawing is a graph showing the current-potential-time relationship employed in carrying out the present invention in accordance with one embodiment thereof.

In accordance with this invention, a body consisting essentially of zirconium and having a zirconium hydride surface layer is electrolytically anodized in aqueous nitric acid solution to remove the hydride surface, fluoride ion is added to the solution and electrolytic anodization is continued to render the surface susceptible to chemical etching and chemical etching is performed in situ using the anodization bath as etchant, or the body may be etched in a separate $HNO_3$-HF etching solution.

In the anodization operation, nitric acid is suitably present in 2.0% to 20% by weight of the aqueous solution, preferably about 3% by weight.

The cathode of the electrolyte cell may suitably be stainless steel or other conductor resistant to nitric acid, such as graphite.

The anode current density is governed by the resistance of the oxide film and the applied potential. Many different anode current densities were tested and found satisfactory. The upper limiting current densities will usually be determined by the geometry of the anode (its current-carrying capacity) and heating effects of the current. Thus a high surface area to volume ratio anode will probably have its current density limited by the ability of the anode to carry the current. The electrolyte is heated by current passage and thus the total current input can be limited by the heat dissipation capability of the electrolyte system. The potential of the process is adjusted to maintain the maximum current density suitable for the particular system until the maximum potential (80–100 volts) is reached. Initially about 5 volts may be employed. The current density is then allowed to decay to a low value which indicates all the surface hydride has been removed.

Apparently the anodic removal of the surface hydride is accomplished in stages. The first stage appears to be electrochemical attack of the continuous and fairly dense hydride layer. The electrical conductivity of the hydride allows current flow at low potentials and one expects the current density to be fairly constant over the anodic surface. This stage could be considered dissolution of the hydride.

The second stage occurs when zirconium metal is exposed at the surface and begins to anodize or form a protective oxide layer. The cell potential increases because of the increasing resistance to current flow at the Zircaloy surface. During this second stage, hydride is still being removed. However, spalling or sloughing of the hydride, oxide and/or metal is noted, apparently due to undercutting of the surface along hydride precipitates.

The third stage occurs when the potential rapidly increases to a high value, above 80 volts. This is an indication that the current paths on the Zircaloy-2 sample have been effectively blocked by the anodic film formed on the surface. The hydride case will have essentially been removed by this time.

The electrolyte may be at any temperature between 20° and 40° C., the upper limit being specified because slight pitting of the zirconium body has been observed at electrolyte temperatures above 40° C.

Subsequent to the nitric acid anodizing, fluoride ions ($HF$, $NH_4F$, $NH_4 \cdot HF$, etc.) are added to the solution and electrolytic anodization is continued to render the anodically formed oxide layer susceptible to chemical etching. The amount of fluoride added affects the subsequent anodizing process. Small amounts of fluorides such as 0.04% will require a high (50–100 v.) anodizing voltage to make the oxide film subject to removal in a standard zirconium etch solution (approximately 33% $HNO_3$, 1.6% HF and 65% $H_2O$ by weight). Alternatively, a larger amount of fluoride (~1%) will require a lower anodizing voltage (5 to 20 v.) and can also act as the etch solution by reducing the potential after decomposing the oxide layer. Any of these processes can be conducted by changing the composition of the solution in one liquid system or moving the body being treated from one liquid system to another having the desired composition. For some applications one method is better and for other applications the other method would be better.

Removal of the hydride layer by electrical anodization in nitric acid is shown in the following.

The process, as applied to one particular specimen, consisted of making a 20-inch section of 1.8 inch-diameter Zircaloy-2 tubing the anode of an electrolytic cell. The cathode of the cell was a central piece of ½-inch-diameter stainless steel tubing which also carried the 3% nitric acid solution which was pumped into the Zircaloy tube section from a recirculation reservoir containing 24 liters of the acid solution. The Zircaloy tube section had an internal surface layer of zirconium hydride approximately 1 mil thick; estimated total hydrogen content, based on analysis of similarly hydrided tubing, 250 p.p.m. The current-potential-time relationship for this process was as set forth above. Analyses of sections from the tube for hydrogen after the anodizing treatment showed 16 p.p.m. The removal of the anodically formed layer and an aditional 2 mils of metal by chemical etching reduced the hydrogen analyses to 12 p.p.m., showing that the processes had removed nearly all of the hydrogen-rich surface layer.

A smaller sample with a thicker hydride layer was partially immersed in a 3% nitric acid solution contained in a 1-liter beaker. This sample was made anodic to stainless steel plate in solution with a maximum potential of 50 volts and a maximum current density of 1 amp./cm.$^2$. The metallographic examination of this specimen after treatment showed complete removal of the dense surface layer from that portion of the tube immersed in the anodizing bath. A layer of detached platelets below the dense layer was not removed.

The anodic treatment of zirconium in nitric acid solutions produces a protective layer of zirconium dioxide on the surface which will form whenever the metal is exposed to the solution. The zirconium hydride layer does not form a protective layer in these solutions and thus is driven into solution until zirconium metal is exposed to the solution. The consequence of these reactions is that the anodically treated specimen is coated with a zirconium oxide layer which complicates further processing such as the standard $HNO_3$-HF etching process to remove a small amount of metal uniformly from the surface. As above noted, a layer of detached hydride platelets is not removed.

It was found that anodically treating the previously anodized specimen in fluoride-bearing solutions effectively reduces the protective character of the anodic-formed layer such that it could be removed and the underlying metal etched with standard zirconium etching solution. The current-potential-time relationship for this sample in $HNO_3$-HF mixture is shown in the accompanying drawing. Hydrofluoric acid was added to the 2.9% $HNO_3$ solution employed in removing the hydride layer anodically after the anodic removal of the hydride layer was complete at the times and in the amounts shown in the drawing. The addition of fluoride caused an immediate increase in current flow at constant voltage, indicating a reduction in the protective properties of the film.

The specimen was removed from the anodizing treatment and immersed for about 7 minutes in standard $HNO_3$-HF etch solution at room temperature which caused all the visible oxide layer to flake off and the part to etch normally. Continued chemical etching to remove about 1 mil of metal produced a normal etched surface appearance. This combined process will also remove any layer of detached platelets of zirconium hydride that escape removal in the plain nitric acid anodizing treatment.

For some applications, in situ etching is very desirable, particularly since the sensitivity of zirconium and zirconium alloys to the rate of flow of a standard etching solution is very high. For such applications a fluoride concentration on the order of 1% may be employed and the initial voltage is reduced to 5 to 20 volts. Maximum and minimum fluoride concentrations have not been established; however, it is clear that somewhat larger and smaller concentrations would be acceptable.

According to a specific example of this embodiment of the invention, a Zircaloy tube was electrolytically anodized while flowing 3% nitric acid through the tube as described above. After the potential reached 100 volts the current was shut off and 1.2 weight percent ammonium bifluoride ($NH_4F \cdot HF$) was added to the anodizing solution. A potential of 5 volts was applied and maintained until the current density reached 100 ma./cm.$^2$ at which time the voltage was backed off to hold the current steady. The potential to be used is variable depending on the particular piece being cleaned and the maximum current density which can be used is fixed by the electrical carrying capacity of the piece being cleaned. Just a few minutes was required for the current density to rise to 100 ma./cm.$^2$ during which time the anodic oxide film on the tube was being decomposed. The minimum voltage employed to hold the current density steady was about 1 volt, the reduction in potential from 5 volts to 1 volt being carried out over a period of about 3 minutes. Anodically assisted chemical etching at a potential of 1 volt employing the anodizing solution as etchant was then continued until the surface had been removed to the desired depth. Under these conditions about 2 mils of the surface is removed in 10 minutes. The anodic assistance is needed since the concentration of nitric acid is low compared to that employed in a standard $HNO_3$-HF etch solution.

The embodiments of the invention in which an exclusive property or privilege is claimed are defined as follows:

1. A process of providing a hydride-free and oxide-free surface on a body consisting essentially of zirconium having a zirconium hydride surface layer comprising electrolytically anodizing said body in an aqueous nitric acid solution to remove the hydride surface, adding fluoride ion to the nitric acid solution and containing the electrolytic anodization whereby the surface of the zirconium body is rendered susceptible to chemical etching.

2. The process of claim 1 wherein the nitric acid concentration in the aqueous nitric acid solution is 2 to 20 weight percent, the fluoride ion is added in a concentration of about 1 weight percent and anodically assisted chemical etching is carried out with the anodizing solution.

3. The process of claim 2 wherein the nitric acid concentration in the aqueous nitric acid solution is 3 weight percent and the fluoride ion concentration is 0.8%.

4. The process of claim 3 wherein the body is a Zircaloy tube and the electrolytical anodization is continued until the potential reaches 100 volts, the potential is shut off, 1.2 weight percent ammonium bifluoride (0.8% F.−) is added, a potential of 5 volts is applied and maintained until the current density reaches 100 ma./cm.$^2$, the voltage is then backed off to hold the current steady, and anodically assisted chemical etching employing the anodizing solution as etchant is continued until the surface is removed to the desired level.

5. The process of claim 1 wherein the nitric acid concentration in the aqueous nitric acid solution is 2–20 weight percent and fluoride ion is added in a concentration of 0.02 to 0.05 weight percent.

6. The process of claim 5 wherein the body is chemically etched in an etching bath containing approximately 33% $HNO_3$, 1.6% HF and 65% water following the electrolytical anodization treatment.

7. The process of claim 6 wherein the nitric acid concentration is 3%, a potential of about 5 volts is initially employed, when the potential reaches 100 volts and the current drops, about 0.05 by weight. HF is added and electrolytical anozidation is continued until the current increases, chemical etching thereupon being carried out as aforesaid.

References Cited
UNITED STATES PATENTS

| | | | |
|---|---|---|---|
| 2,773,023 | 12/1956 | Raynes et al. | 204—141.5 |
| 3,371,021 | 2/1968 | Delafosse et al. | 204—129.35 |
| 3,515,655 | 6/1970 | Ravin | 204—141.5 |

THOMAS TUFARIELLO, Primary Examiner

U.S. Cl. X.R.

204—129.35, 129.75